United States Patent [19]

Burns et al.

[11] Patent Number: 4,573,797
[45] Date of Patent: Mar. 4, 1986

[54] ANALOG FIBER GYRO WITH EXTENDED LINEAR RANGE

[75] Inventors: William K. Burns, Alexandria, Va.; Robert P. Moeller, Fort Washington, Md.

[73] Assignee: The United States of America as represented by the Secretary of the Navy, Washington, D.C.

[21] Appl. No.: 583,549

[22] Filed: Feb. 24, 1984

[51] Int. Cl.$^4$ .................... G01B 9/02; G01C 19/64
[52] U.S. Cl. ................................................. 356/350
[58] Field of Search ........................................ 356/350

[56] References Cited

U.S. PATENT DOCUMENTS 4,120,587 10/1978 Vali et al. ............................. 356/350

OTHER PUBLICATIONS

T. Giallorenzi et al., "Optical Fiber Sensor Technology", IEEE J.Q.E., vol. QE-18, No. 4, Apr. 1982, pp. 626-665.

Primary Examiner—Vincent P. McGraw
Assistant Examiner—S. A. Turner
Attorney, Agent, or Firm—Robert F. Beers; William T. Ellis

[57] ABSTRACT

A gyroscope system for obtaining an extended linear dynamic range for platform rotation rate measurements comprising a first fiber optic gyroscope with a first optical fiber coil described by a first quantity $L_1R_1/\lambda_1$ where $L_1$ is the length of the first optical fiber coil, $R_1$ is the radius of the first fiber coil, and $\lambda_1$ is the light source wavelength, this first quantity being chosen to provide a linear output for a first range of small rotation rates of the platform; a second fiber optic gyroscope with a second optical fiber coil described by a second quantity $L_2R_2/\lambda_2$ with this second quantity being chosen to provide a linear output for a second range of large rotation rates of the platform, with this second range partially overlapping the first range; voltage controlled oscillators for converting the gyroscope signals to pulse frequency signals; a circuit for determining whether a reference rotation rate within the overlap between the first and second ranges has been reached and generating a control signal in accordance therewith; a pulse counter; and a switch for switching one or the other of the pulse frequency signals to the pulse counter in accordance with the control signal so that a gyroscope which is operating within its linear range is utilized.

31 Claims, 3 Drawing Figures

ANALOG FIBER GYRO WITH EXTENDED LINEAR RANGE

BACKGROUND OF THE INVENTION

The present invention relates generally to analog gyroscopes, and more particularly to an analog fiber optic gyroscope system which provides an extended linear dynamic range.

Gyroscopes are utilized in a variety of different applications including as rate sensors, tachometers for generator speed control, and inertial navigation and non-magnetic compasses. In its most common application, the gyroscope is disposed in a gimbal mounting platform and used for stabilizing a body about one or more mutually perpendicular axes. The device so mounted may be used to stabilize a space platform with respect to the system of fixed stars either as a visual aid in navigation or to supply information for actuating automatic piloting or navigating mechanisms.

It has been known for some time that the Sagnac interferometer can be used to detect the rotation rate of any rotating frame, and thus can be used as a gyroscope. The Sagnac interferometer is based on the existence of a measurable phase shifting effect caused by angular motion upon the transmission and subsequent interference of counter propagating electromagnetic waves in a light circuit loop path disposed in the plane of the angular motion. By way of example, if an optical fiber coil is disposed on a platform, with the axis of the coil perpendicular to the platform plane, and the platform is at rest, then co-rotating and counter-rotating optical beams propagating in the fiber optic coil suffer exactly the same time delay in propagating in opposite directions through the coil. Accordingly, when these beams meet, they interfere to provide a certain light amplitude output. However, when the platform is rotating, there is a slight difference between the propagation times through the coil of on the order of $10^{-3}$ps due to the effects of relativity. This time delay will cause a change in interference which will change the light intensity. The change in the light intensity is proportional to the rotation rate.

Fiber optic gyroscopes based on the foregoing Sagnac effect are of substantial current interest for the previously noted applications, but must satisfy stringent specifications, including linearity of output. However, since the Sagnac interferometer, in its simple form, is an analog device, it is typically limited to a linear range of approximately 40 dB, whereas 60 dB is often required. One method of obtaining the 60 dB linear range is to utilize a phase nulling scheme as proposed by Cahill and Udd, Applied Optics 19, 3054 (1980). This reported design basically shifts the frequency of the counter-propagating beams in order to null the Sagnac effect, and then measures frequency shift. The problem with this approach is that it requires bulk optic frequency shifters. Thus, the design has a high power requirement to operate these frequency shifters and, it cannot easily be implemented in an all fiber format.

OBJECTS OF THE INVENTION

Accordingly, it is an object of the present invention to extend the linear dynamic range of an analog fiber optic gyroscope.

It is a further object of the present invention to extend the linear dynamic range of a fiber optic gyroscope to at least 60 dB linearity without frequency shifting.

It is yet a further object of the present invention to provide an at least 60 dB linear dynamic range gyroscope system with improved optical stability in conjunction with simpler construction, and fewer optical components.

Other objects, advantages, and novel features of the present invention will become apparent from the detailed description of the invention, which follows the summary.

SUMMARY OF THE INVENTION

Briefly, the present invention comprises a gyroscope system for obtaining an extended linear dynamic range for platform rotation rate measurements comprising a first fiber optic gyroscope with a first optical fiber coil being described by the parameters of a first quantity $L_1R_1/\lambda_1$, where the parameters $L_1$ and $R_1$ are the length and radius, respectively, of the first coil, and $\lambda_1$ is the wavelength of the light propagating therein; the parameters of this quantity providing a linear output for a first range of rotation rates of the platform; a second fiber optic gyroscope with a second optical fiber coil being described by the parameters of a second quantity $L_2R_2/\lambda_2$, where the parameters $L_2$ and $R_2$ are the length and radius, respectively, of the second coil, and $\lambda_2$ is the wavelength of the light propagating therein; the parameters of this quantity providing a linear output for a second range of rotation rates of the platform which range partially overlaps the first range; a circuit for comparing at least one of the detector outputs to a reference value equal to a gyroscope output valve within the overlap between the first and second ranges and generating a control signal in accordance therewith, and a switching circuit for switching one or the other of these outputs to the gyroscope system output in accordance with this control signal so that the gyroscope which is operating within its linear range is utilized.

In a preferred embodiment, the switching circuit includes voltage controlled oscillators for converting the output signals from the gyroscopes to pulse frequency signals proportional thereto, and a first switch for switching one or the other of the pulse frequency signals to a pulse counter. This embodiment also includes circuitry for determining the polarity of the gyroscope signal for the pulse frequency signal switched through to the pulse counter, and circuitry for controlling the pulse counter to either add or subtract this frequency pulse signal from the count held in the counter in accordance with the gyroscope output signal polarity. This embodiment further includes circuitry for shifting the level of one of the first and second gyroscope output signals in order to ensure that the voltage controlled oscillators for these gyroscopes produce the same pulse frequency signal at a reference gyroscope rotation rate.

In a preferred embodiment of the present invention this gyroscope system provides a measurement for both the angular position of the platform, and the platform rotation rate.

DETAILED DESCRIPTION OF THE PREFERRED EMBODIMENT

The present gyroscope system is designed to provide an extended linear measurement range for the rotation rate parameters of a platform. One of the problems with obtaining such an extended linear range with a standard optical fiber Sagnac interferometer is that the optical intensity obtained from the interference of the counter propagating light beams in the interferometer is given by the following equation $$I \sim (1 + \sin 2\phi) = \left(1 + \sin\left[\frac{4\pi LR\Omega}{\lambda c}\right]\right)$$

where $2\phi$ is the Sagnac phase shift between the co-rotating and counter-rotating beams, I is the detector output current, R is the optical fiber coil radius, L is the optical fiber coil length, $\Omega$ is the rotation rate, $\lambda$ is the source wavelength, and c is the speed of light. As is well known, the sin of a small angle is equal to the angle, itself. Thus, for small rotation rates having small phase shifts, the current intensity output is directly proportional to the Sagnac phase shift, and yields a linear output. However, for rotation rates yielding phase shifts of over 10°, the sin $2\phi$ is no longer equal to $2\phi$. Accordingly, the gyroscope output becomes non linear. Thus, it can be seen that for large rotation rates, the parameters of the gyroscope must be changed. From a review of the above equation, it can be seen that either the coil radius R, or the coil length L, or the wavelength $\lambda$, or any pair thereof, or all three parameters can be varied to compensate in the equation for a large rotation rate $\Omega$ and keep the angle $2\phi$ small. Note however, that R and $\lambda$ generally have only a small range of possible variation. Thus, it is convenient to vary the coil length L to compensate for large rotation rates $\Omega$.

From the above, it can be seen that it is useful to have two or more gyroscopes in a gyroscope system each with different $LR/\lambda$ quantities to describe their respective optical fiber coils, to accommodate different rotation rate ranges of the platform. A switching circuit could then be provided to switch from gyroscope to gyroscope as the rotation rate changes in order to keep the output of the gyroscope system linear.

The present invention is disclosed in the context of a two-gyroscope system. However, it should be noted that more than two gyroscopes can clearly be utilized, if desired.

Figure 1:
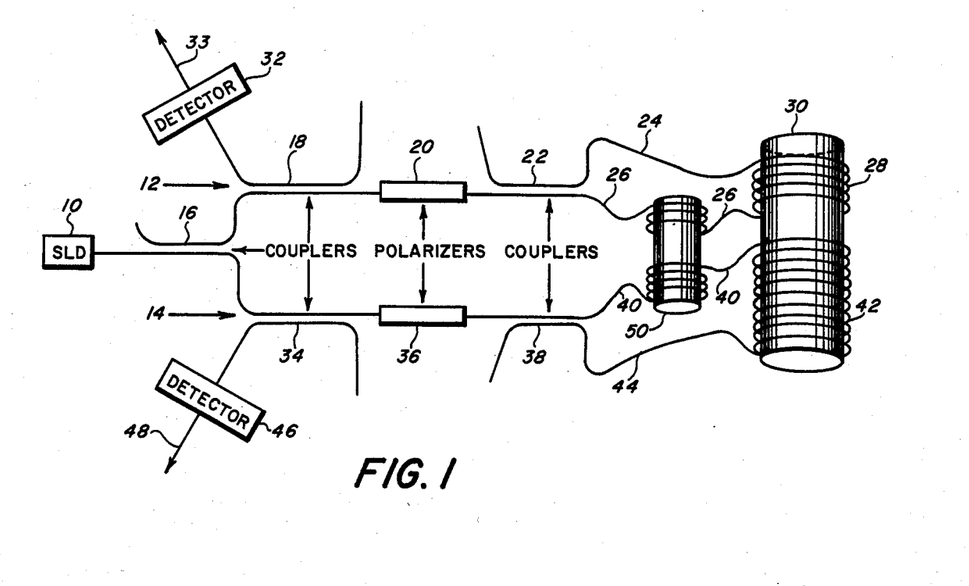
FIG. 1 is a schematic diagram of one embodiment of the two-gyroscope design for the present invention.

Referring now to the drawings, wherein like referenced characters designate like or corresponding items throughout the views, FIG. 1 shows an embodiment of a two gyroscope system. A source of light 10 is applied to two separate gyroscopes 12 and 14 by means of a beam splitter 16. The light propagating in gyroscope 12 passes through a coupler 18, a polarizer 20, and then is split by a beam splitting coupler 22 to co-propagate on line 24 and counter-propagate on line 26 through an optical fiber coil 28 wound around a cyclindrical support 30. When these two co-and-counter propagating optical beams have traversed in their respective directions through the optical fiber coil 28, they again impinge upon the coupler 22 and interfere with each other yielding a light amplitude signal. This light amplitude signal is applied through the polarizer 20 and a portion thereof is applied via the coupler 18 to an optical detector 32. As noted previously, if the cyclindrical support 30 is disposed on and with its axes perpendicular to a platform, and if that platform is not rotating in the plane of the optical fiber coil, then there will be interference at the coupler 22, and the light detected at the detector 32 yields a certain current output. However, if the platform on which the support 30 is disposed begins to rotate, then there will be a change in interference between the light beams at the coupler 22, and the detector current output on line 33 changes accordingly. This measurable change in intensity is due to the relative phase shift between the light propagating in the co-and counter-directions in the optical fiber coil 28 caused by the rotation of the platform. This change in the intensity, after demodulation, is proportional to the phase shift between the two counter propagating optical beams, which, in turn, is proportional to the rotation rate in the plane of the optical fiber coil 28. The quantity $LR/\lambda$ of the coil 28 may be specified in order to provide a linear device output at the detector 32 for a first range of rotation rates of the platform.

Likewise, the light beam from the beam splitter 16 which propagates in the gyroscope 14 is applied through a coupler 34, and a polarizer 36, to a coupler and beam splitter 38. The coupler 38 splits the light beam so that it propagates on line 40 in one direction through an optical fiber coil 42 wound around the cyclindrical support 30, and in the counter-propagating direction on line 44 through the optical fiber coil 42. When these two counter propagating beams have traversed in their respective directions through the optical fiber coil 42, they again impinge upon the coupler 38 and interfere with each other. This interference light signal is then applied through the polarizer 36 and a portion thereof is coupled via the coupler 34 to a light detector 46. This light detector 46 also generates an output current on line 48 which, after demodulation, is proportional to the interference light intensity of the gyroscope 14 on line 48.

The quantity $LR/\lambda$ for this second coil 42 is specified to provide a linear output for a second range of platform rotation rates which partially overlaps the first range.

In order to convert the sensitivity of this gyroscope device to its maximum value for a desired range of rotations, a non-reciprocal, highly stable phase shift may be introduced between the counter propagating beams in each of the optical fiber coils 28 and 42. By way of example, in order to obtain a maximum value for small rotation rates, a non-reciprocal, highly stable 90° phase shift may be introduced between the counter propagating beams in each fiber coil. There are a number of approaches available in order to introduce this phase bias into the optical fiber gyroscope system. In the present design, for the sake of simplicity, a piezoelectric cylinder is utilized in order to introduce a phase shift which varies in time in accordance with an A.C. drive frequency. Such piezoelectric phase shifters are well known in the art and are used in order to place the gyroscope operation in the linear portion of the sinusoidal response of the gyroscope. In the embodiment of FIG. 1, the optical fiber 26 going to the optical fiber coil 28 is wound around a piezoelectric cylinder 50. Likewise, the optical fiber 40 which goes to the optical fiber coil 42 is wound around the piezoelectric cylinder 50 in order to obtain the non-reciprocal phase shift. The piezoelectric cylinder is, of course, driven by an A.C. drive circuit 51 (see FIG. 2) which is well known in the art. By way of example, the A.C. drive frequency may be 100 kHz.

It should be noted that all of the fiber utilized should be conveniently single mode polarization holding fiber. Likewise, the couplers 16, 18, 22, 34, and 38 may be of the type disclosed in application Ser. No. 561,866, filed on Dec. 16, 1983 entitled "Polarization Preserving Single Mode Fiber Coupler" by M. Abebe, W. K. Burns, and C. A. Villarruel. Likewise, the polarizers 20 and 36 may be conveniently realized by application Ser. No. 558744, filed on Dec. 7, 1983, entitled "Fiber Optical Polarizer for High-Birefringent Fiber" by W. K. Burns and C. A. Villarruel.

The light source 10 may be conveniently realized by a superluminescent diode of the type disclosed, for example, by T. P. Lee et al., IEEE Journal of Quantum Electronics, Vol. QE 9, No. 8, August 1973, pages 820–828. These devices are commercially obtainable from a variety of companies including the General Optronics Corp. Such diodes typically are sources of high power (greater than 1 mW), broadband (bandwidth of 100–200 Angstroms), essentially unpolarized, and generate spatially coherent light.

It can be seen that with the present design using a single source, and winding both optical fiber coils on the same support cylinder 30, and using the same piezoelectric cylinder 50, the number of additional optical components for this two gyroscope system is limited to three couplers and one fiber polarizer. However, the electronics required for this design is significantly reduced relative to the phase nulling gyro systems of the prior art.

Figure 3:
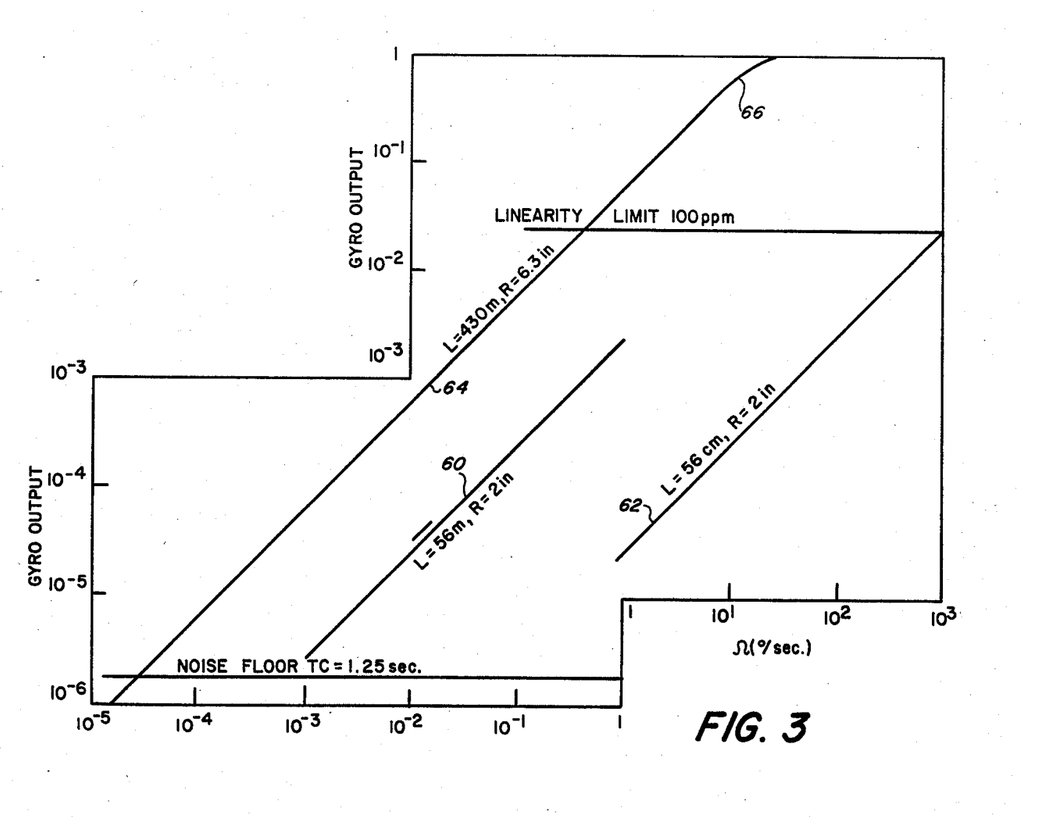
FIG. 3 is a graph of the extended linear output for the present gyroscope system in terms of the rotation rate.

FIG. 3 shows the output curves 60 and 62 for two gyros, each utilizing a two inch radius coil but with different coil lengths L, in conjunction with the output curve 64 for a prior art gyroscope. Curve 60 represents the output for a low rotation rate gyroscope 12 having an optical fiber coil 28 with a length of 56 meters and covering a first linear range of $10^{-3}$/sec. to 1°/sec. Curve 62 represents the output for a high rotation rate gyro 14 having an optical fiber coil 42 with a length of 56 cm, and covering a second linear range of 1°/sec to $10^3$°/sec. Thus, it can be seen that there is a factor of 100 difference between the coil lengths L for the coils 28 and 42. These curves 60 and 62 lie between a linearity limit of 100 ppm (0.25 radians) and an experimental noise floor of $10^{-1}$°/hour. These limits were obtained from curve 64 which is the output for a lab version of a prior art gyroscope using a bulk first coupler and polarizer, and using an optical coil with the parameters L=450 m, and R=6.3 inches. It is clear that the curves 60 and 62 can be adjusted between these limits simply by adjusting the coil lengths, or the coil radii, or the wavelength. With these two gyroscopes, it is clear that six decades of linearity are readily obtainable. Thus, a significantly extended linear range for this gyroscope package is realized. Note that the curve 64 for the lab version of the prior art gyroscope begins to show its non-linearity at approximately the point 66. This non-linearity is due to the phase shift caused by the rotation of the platform increasing to a point so that the sine of this phase angle is no longer linear.

It should be noted that although the foregoing gyroscope linear ranges were varied by changing the optical fiber coil lengths L for each gyroscope, that it is equally possible to vary the radius of the optical fiber coil R, or the wavelength λ of the optical source. Thus, any one of these parameters, or any pair of these parameters, or all of these parameters may be varied in order to change the linear range for each of the gyroscopes in the gyroscope system.

Figure 2:
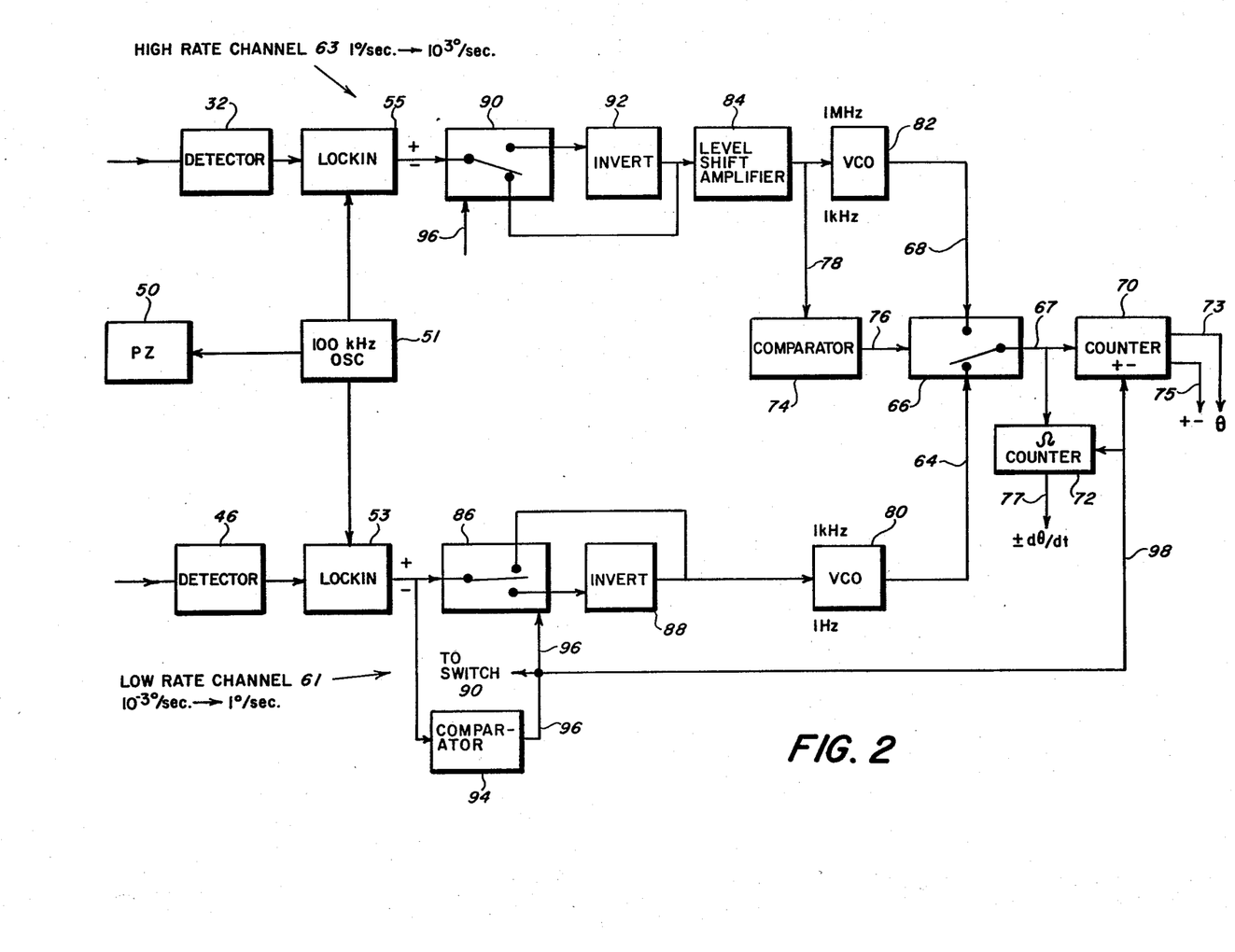
FIG. 2 is a schematic block diagram of one embodiment of the control system which may be utilized with the present invention.

FIG. 2 shows a measurement and control system for the two-gyroscope system shown in FIG. 1. This measurement and control system comprises a low rate channel 61 and a high rate channel 63 for processing the output signals from the detectors 46 and 32, respectively. The low rate channel 61 processes its signal and then applies its output on line 64 to one input terminal of a switch 66. Likewise, the high rate channel 63 processes its signal and applies its output on line 68 to a second input terminal of the switch 66. The output from switch 66 is applied to a set of two counters, an angular position counter 70, and a rotation rate frequency counter 72. A comparator 74 is utilized to compare the rotation rate of the platform to a reference rotation rate and to generate a control signal on line 76 to control the switch 66 in order to insure that the output from the gyroscope which is operating within its linear range is provided to the counters. The output signal from either optical detector, 32 or 46, or both, after demodulation, may be utilized to determine the platform rotation rate for use in the comparator 74. However, because the output from the high rate channel 63 is linear at the crossover point of 1 kHz (see FIG. 3), it is preferred to take the signal from some point in the high rate channel 63 and apply it to the comparator 74 for comparison with a reference value. In the embodiment shown in FIG. 2, this signal is taken from the high rate channel 63 via the line 78.

The comparator 74 operates simply by generating a switching signal if the signal on line 78 rises above the reference value set in the comparator 74. This first control signal generated by the comparator 74 on line 76 then operates to switch the switch 66, which is initially set to apply the output from the low rate channel 61 on line 64 to the counters, to the line 68 for the high rate channel 63. Note that the initial setting of the switch 66 is made so that the low rate channel 61 is applied to the counters, because it is assumed that the platform will start from a rest position. Clearly, when the signal on line 78 drops to the reference value or below, then the first control signal on line 76 operates to switch the switch 66 back to the line 64.

As noted previously, it is desirable to add a non-reciprocal phase shift to the light propagating in the optical coils 28 and 42. This phase shift is made non-reciprocal by varying the phase shift in time in accordance with an A.C. drive frequency. In the present example, this A.C. drive frequency is 100 kHz. An oscillator 51 which may be utilized to generate this A.C. drive frequency is shown in FIG. 2.

Because the output optical signals detected by the optical detectors 46 and 32 contain this A.C. drive frequency modulation thereon, they may be demodulated thereby. In order to demodulate these detector signals in accordance with this A.C. drive frequency, a lock-in amplifier circuit 53 is disposed after the optical detector 46 in the low rate channel 61. Likewise, a lock-in amplifier 55 is disposed after the optical detector 32 in the high rate channel 63. These lock-in amplifiers operate to detect signals at this A.C. drive frequency, while rejecting the D.C. term and all other harmonics. Thus, these lock-in amplifiers provide a D.C. signal output which is proportional to the rotation rate. The polarity of this D.C. output signal represents the direction of the phase change relative to the A.C. drive frequency reference from oscillator 51. Thus, these lock-in amplifiers provide a phase sensitive detection for the system.

The first counter 70 is a standard pulse counter with a polarity input for determining whether the pulses applied to the counter input are to be added or subtracted from the count held in the counter. The signal line 98 to this polarity input thus simply provides a signal representative of the polarity of the signals applied on line 67 to the counter 70.

In order to obtain an angular position count in the counter 70, the output signals from the detectors 46 and 32, must be converted to pulse frequency signals prior to their application on lines 64 and 68 to the switch 66. Thus, a 1 kHz voltage controlled oscillator 80 is disposed in the low rate channel 61, while a 1 MHz voltage controlled oscillator 82 is disposed in the high rate channel 63. These voltage controlled oscillators convert the channel voltages to a pulse frequency as follows:

For the low channel, $10^{-3°}/\text{sec} \rightarrow 1 \text{ Hz}$, $1°/\text{sec} \rightarrow 1 \text{ kHz}$.

For the high channel (after a level shift of 100, to be discussed below) $1°/\text{sec} \rightarrow 1 \text{ kHz}$, $10^{3°}/\text{sec} \rightarrow 1 \text{ MhZ}$.

VCO's of this range are standard items in the art. Alternatively, VCO's from 1–2 MHz through 10–11 MHz, may be utilized. Accordingly, it can be seen that the rotation rate is now proportional to the frequency output from the VCO's 80 and 82.

Because each of the gyroscopes is designed with a different set of L, R, and λ parameters for its optical coil, each gyroscope generates outputs over their linear range at a different voltage level. However, at the crossover frequency i.e. the reference rotation rate, it is required that both VCO's generate the same frequency output. In the example shown in FIG. 3, there is a voltage level shift of 100 between the curve 60 for the low rate channel 61 and the curve 62 for the high rate channel 63. Accordingly, a level shifting circuit 84 is required in order to make each of the gyroscope channels produce the same frequency output at the overlapping rate of 1°/sec., i.e., 1 kHz. This level shifting circuit could either be an amplifier or an attenuator disposed in one of the gyroscope control channels. In FIG. 2, the level shift circuit 84 comprises an amplifier disposed in the high rate channel in order to effect a level shift of 100. This level shifter thus insures that the frequency output at the overlapping rate is the same for both VCO's.

As noted above, the counter 70 includes a polarity control input for determining whether the pulse input is to be added or subtracted from the count held in the counter 70. Additionally, the VCO's 80 and 82 are generally implemented to operate on a unipolar input signal. Accordingly, circuitry is required in the channels to determine the polarity of the gyroscope output signal for the pulse frequency signal which is switched through to the counter 70. Likewise, circuitry is required to insure that the signal applied to each of the VCO's is unipolar. There are a number of methods of accomplishing the foregoing operations. In the embodiment shown in FIG. 2, a second switch 86 in combination with an inverter circuit 88 is disposed in the low rate channel 61 in front of the VCO 80. Likewise, a second switch 90 in combination with an inverter circuit 92 is disposed in the high rate channel 63 in front of the VCO 82. When the input signal from the low rate gyroscope channel 61 has a positive polarity at the switch 86, then the switch 86 operates to bypass the inverter circuit 88 and apply the signal directly to the VCO 80. However, when the polarity of the low rate channel signal is negative, then the switch 86 operates to apply the low rate gyroscope signal through the inverter circuit 88 to invert the polarity of that signal prior to its application to the VCO 80. The operation of this switch 86 is controlled by a comparator 94 which takes the output from the lock-in amplifier 53 and compares that signal to a reference voltage, such as zero voltage, in order to determine the polarity of the signal. This comparator 94 then generates a control signal in accordance with the polarity of the low rate gyroscope signal. This polarity control signal is then applied on line 96 to control the operation of the switch 86. Since both channels change polarity at the same time, the comparator output on line 96 is also used to control switch 90 in the high rate channel. Thus, the switch 90 either applies the output signal from the lock-in amplifier 55 through the inverter 92 or bypasses the inverter 92, depending upon the polarity of this high rate gyroscope signal. The polarity indicating control signal on line 96 for the low rate channel 61, is also applied via line 98 to the input terminal to the polarity control input for the counter 70.

In operation, the rotation of a platform on which the present system is disposed will cause a phase shift between the counterpropagating beams in each of the gyroscopes 12 and 14. The resultant light interference signals detected by the optical detectors 46 and 32 are demodulated and applied through their respective channels to the switch 66. Assuming that the platform started from a rest position, the voltage signal on line 78 will be below the reference value for the comparator 74. Accordingly, the switch 66 is operated to apply the signal on line 64 to the pulse counter 70. Likewise, the polarity indicating control signal on line 96 is applied to the counter polarity control terminal of counter 70 to control the addition or subtraction of the counts. When the rotation rate for the platform generates a voltage level on line 78 which exceeds the reference value in comparator 74, then the control signal on line 76 causes the switch 66 to apply the signal on line 68 to the counter 70. Counter 70 accordingly simply counts cycles, each of which has a constant angular value, in the present case $10^{-5}$ radians/cycles. This count provides the angular position for the platform.

If the platform slows its rotation rate to zero, and then reverses its rotation direction, the switch 66 again switches over to apply the output signal on line 64 and the polarity indicating control signal on line 96 to the counter 70. However, because the direction of rotation has reversed, the polarity of the output signal from the lock-in amplifier 53 has become negative. Accordingly, the polarity indicating control signal on line 96 and line 98 causes the counter 70 to subtract these pulse signals being applied on line 67 from the count held in the pulse counter.

The second counter 72 is utilized to determine the rotation rate from the signal on line 67. This rotation rate measurement is simply accomplished by counting the pulses on line 67 over a fixed period of time. Accordingly, this counter may be realized by a standard frequency meter with the addition of a polarity indication showing the polarity of the rotation rate.

It can be seen that the foregoing system provides a digital output $\theta$ on line 73 representing the angular position of the platform, the polarity of the optical detector signal, i.e. the clockwise or counterclockwise direction of rotation of the platform on line 75, and a digital indication of the rotation rate $d\theta/dt$ of the platform on line 77.

It should be noted that there are a variety of circuit configurations which could be utilized in order to realize the control circuit set forth in FIG. 2. One variation that could be used would be to use a set of two voltage controlled oscillators for each gyroscope channel, one VCO for the negative polarity, and one for the positive polarity in each channel. A switch, such as the switches 86 and 90, could be utilized then to switch one or the other of these VCO outputs through to the switch 66. As noted previously, VCO's can be run in the MHz range and the signal later extracted from the MHz carrier. Operation in the MHz range may have the advantage of easing the VCO stability and linearity requirements.

The present multiple gyroscope configuration provides a 60 dB linear dynamic range from an analog device, without using phase nulling techniques. The number of additional optical components and additional electronics required for the present approach is less than for a phase nulling gyroscope. Moreover, the present approach does not require bulk optic components, and it does not require high power Bragg cells. Accordingly, optical stability should be much better, and construction much simpler, since bulk alignment is not required.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An extended linear dynamic range fiber optic gyroscope system with a gyroscope system output comprising:
   a fiber optic first gyroscope disposed on a platform for obtaining a linear output for a first range of platform rotation rates, and including a fiber optic interofermeter coil wherein light is introduced into said first coil for propagating therearound in mutually opposite directions to emerge therefrom for detection of the relative phase shift induced by rotation of said platform, said first gyroscope further including a first detector and demodulator for providing a quantity proportional to said relative phase shift, said first coil having a first axis and being described by a first quantity $L_1R_1/\lambda_1$, where $L_1$ and $R_1$ are the length and radius, respectively, of the first coil, and $\lambda_1$ is the wavelength of the light propagating therein, said first quantity providing said linear gyroscope output at said detector and demodulator for said first range of platform rotation rates;
   a second fiber optic gyroscope disposed on said platform for obtaining a linear output for a second range of platform rotation rates, which range partially overlaps said first range, and including a second fiber optic interferometer coil, wherein light is introduced into said second coil for counter propagating therearound in mutually opposite directions to emerge therefrom for detection of the relative phase shift induced by the rotation of said platform, said second gyroscope further including a second detector and demodulator for providing a quantity proportional to said relative phase shift, said second coil having a second axis which is parallel to said first axis and being described by a second quantity $L_2R_2/\lambda_2$, where $L_2$ and $R_2$ are the length and radius, respectively, for said second coil, and $\lambda_2$ is the wavelength of the light propagating in said second coil, said second quantity providing said linear gyroscope output for said second range of platform rotation rates;
   means for comparing at least one of the detector outputs to a reference value equal to a gyroscope output value within the overlap between said first and second ranges and generating a control signal in accordance therewith; and
   a switching circuit for switching one or the other of the detector and demodulator outputs of the gyroscope system output in accordance with said control signal so that the gyroscope which is operating within its linear range is utilized.

2. A gyroscope system as defined in claim 1, further comprising means for measuring the angular position of said platform in the plane perpendicular to said first and second coil axes, said angular position measuring means connected to the output of said switching circuit.

3. A gyroscope system as defined in claim 2, wherein said switching circuit further comprises:
   first voltage controlled oscillator means for converting the output signal from said first detector and demodulator to a first pulse frequency signal proportional thereto;
   a second voltage controlled oscillator means for converting the output signal from said second detector and demodulator to a second pulse frequency signal proportional thereto; and
   a first switch for switching one or the other of the pulse frequency signals to said angular position measuring means in accordance with the control signal from said comparing means.

4. A gyroscope system as defined in claim 3, wherein said angular position measuring means comprises a first pulse counter.

5. A gyroscope system as defined in claim 4, wherein said first pulse counter includes a polarity input for determining whether said first pulse counter adds or subtracts the pulses from said first switch; and wherein said gyroscope system further comprises
   means for determining the polarity of the detector and demodulator output signal for the pulse frequency signal switched through said first switch to said first pulse counter, and applying a second control signal representative thereof to the polarity input of said first pulse counter.

6. A gyroscope system as defined in claim 5, further comprising a level shift circuit disposed before one of said first and second voltage controlled oscillator means in order to ensure that each of said first and second gyroscopes produces the same frequency output from their respective voltage controlled oscillator means at said reference value.

7. A gyroscope system as defined in claim 6, further comprising:
   means for adding a non-reciprocal phase shift to the light propagating in one direction in each of said first and second coils, said phase shift varying in time in accordance with an A.C. drive frequency.

8. A gyroscope system as defined in claim 7, wherein said detector and demodulator for each gyroscope includes lock-in means for demodulating the detected light signals in accordance with said A.C. drive frequency.

9. A gyroscope system as defined in claim 8, wherein said optical source includes a superluminescent diode.

10. A gyroscope system as defined in claim 9, further comprising a second counter for counting the voltage controlled oscillator output pulses switched through by said first switch over a short period of time to obtain the rotation rate.

11. A gyroscope as defined in claim 10, wherein said polarity determining means comprises
   a first inverter with its output connected to said first voltage controlled oscillator means;
   a comparator for comparing the output signal from one of said first and second detector and demodulators to a polarity reference to determine the polarity of the signal and generating a second control signal in accordance therewith;
   a second switch for switching the output signal from said first detector and demodulator to said first voltage controlled oscillator means or through said inverter to said first voltage controlled oscillator means in accordance with said second control signal; said second control signal also comprising the polarity signal applied to said first counter;
   a second inverter with its output connected to said second voltage controlled oscillator means; and
   a third switch for switching the output signal from said second detector and demodulator to said second voltage controlled oscillator means or through said second inverter to said second voltage controlled oscillator means in accordance with said second control signal.

12. A gyroscope system as defined in claim 11, wherein said first and second coils are wound on the same support.

13. A method for obtaining extended linear dynamic range gyroscope measurements for the rotation parameters of a platform, comprising the steps of:
   choosing a first fiber optic gyroscope having a first optical fiber coil described by the quantity $L_1 R_1/\lambda_1$, where $L_1$ and $R_1$ are the length and radius, respectively, of the first coil, and $\lambda_1$ is the wavelength of the light propagating in the first coil, said first quantity providing a linear gyroscope output for a first range of rotation rates, said first coil having a first axis:
   choosing a second fiber optic gyroscope having a second optical fiber coil described by a second quantity $L_2 R_2/\lambda_2$, where $L_2$ and $R_2$ are the length and radius, respectively, of said second coil, and $\lambda_2$ is the wavelength of the light propagating in said second coil, said second quantity providing a gyroscope output which is linear for a second range of rotation rates which partially overlaps said first linear range, said second coil having a second axis which is parallel to said first axis;
   generating a first gyroscope output signal from said first fiber optic gyroscope;
   generating a second gyroscope output signal from said second fiber optic gyroscope;
   determining when said platform has reached a certain reference rotation rate equal to a value within the overlap between said first and second ranges and generating a control signal in accordance therewith; and
   switching one or the other of said gyroscope output signals through for further measurement in accordance with said control signal in order to ensure that the gyroscope which is operating within its linear range is utilized.

14. A method as defined in claim 13, comprising the steps of:
   converting said first gyroscope output signal to a first pulse frequency signal proportional thereto;
   converting said second gyroscope output signal to a second pulse frequency signal proportional thereto;
   wherein said switching step comprises the step of switching one or the other of said pulse frequency signals through for further measurement; and
   counting the pulses of the pulse frequency signal switched through in order to determine rotation rate and to determine an angular position count.

15. A method as defined in claim 14, further comprising the step of:
   determining the polarity of the gyroscope output signal for the pulse frequency signal switched through for further measurement; and
   either adding or subtracting this frequency pulse signal from said angular position count in accordance with said gyroscope output signal polarity.

16. A method as defined in claim 15, further comprising the step of shifting the level of one of said first and second gyroscope output signals in order to ensure that the first and second gyroscope output signals produce the same pulse frequency signal at said reference rotation rate.

17. A method as defined in claim 16, further comprising the steps of:
   adding a non-reciprocal phase shift during the generation of said first and second gyroscope output signals, said phase shift varying in time in accordance with an A.C. drive frequency; and
   demodulating the first and second gyroscope output signals in accordance with said A.C. drive frequency.

18. An extended linear dynamic range gyroscope system for measuring the rotation parameters of a platform, comprising:
   a first fiber optic gyroscope for generating a first gyroscope signal which is linear for a first range of rotation rates of said platform in a plane;
   a second fiber optic gyroscope for generating a second gyroscope signal which is linear for a second range of platform rotation rates in said plane, said second range partially overlaping said first linear range;
   means for shifting the level of one of said first and second gyroscope signals in order to ensure that said gyroscope signals are approximately equal at a reference rotation rate which has a value within the overlap between said first and second ranges;
   means for converting said first and second gyroscope signals to pulse frequency signals proportional thereto;

means for determining whether said reference rotation rate has been reached or exceeded by said platform and generating a control signal in accordance therewith;

a first pulse counter; and a switch for switching one or the other of said pulse frequency signals to said pulse counter in accordance with said control signal to ensure that a gyroscope which is operating within its linear range is utilized.

19. A gyroscope system as defined in claim 18, further comprising:

means for determining the polarity of the gyroscope output signal for the pulse frequency signal switched through to said first pulse counter and generating a signal representative of this polarity; and means for applying this polarity representative signal to said first pulse counter to control whether the frequency pulse signal switched to said first pulse counter is added or subtracted from the count held in said first pulse counter;

wherein the count held in said first pulse counter is representative of the angular position of said platform.

20. A gyroscope system as defined in claim 19, further comprising a second frequency meter counter connected to the output of said switch for measuring the rotation rate of said platform and providing a polarity from said polarity representative signal.

21. A gyroscope as defined in claim 20, wherein said first and second fiber optic gyroscopes each comprise a fiber optic interferometer coil, wherein light is introduced into said coil for propagating therearound in mutually opposite directions to emerge therefrom for detection of the relative phase shift induced by rotation of said platform, wherein the coil for said first gyroscope is described by a first quantity $L_1 R_1/\lambda_1$, where $L_1$ and $R_1$ are the length and radius of the first coil, respectively, and $\lambda_1$ is the wavelength of the light propagating in said first coil, said first quantity providing a linear device output for said first range of rotation rates of said platform, while the coil for said second gyroscope is described by a second quantity $L_2 R_2/\lambda_2$, where $L_2$ and $R_2$ are the length and radius of said second coil, and $\lambda_2$ is wavelength of the light propagating in said second coil, said second quantity providing a linear device output for said second range of rotation rates of said platform, said first and second gyroscope coils being coaxial and wound on a single support.

22. A gyroscope system as defined in claim 21, wherein said first and second gyroscopes further include a circuit for adding a non-reciprocal phase shift to the light propagating in one direction in each of said first and second gyroscope coils, said phase shift varying in accordance with an A.C. drive frequency; and a demodulating circuit for demodulating the output signals from said first and second gyroscopes in accordance with said A.C. drive frequency.

23. An extended linear dynamic range fiber optic gyroscope system with a gryoscope system output, comprising:

a first optical fiber gyroscope disposed on a platform for generating a first output proportional to the rotation rate of the platform in a plane, said first output being linear for a first range of platform rotation rates;

a second optical fiber gyroscope disposed on a platform for generating a second output proportional to the rotation rate of the platform in said plane, said second output being linear for a second range of platform rotation rates which partially overlaps said first linear range;

means for comparing at least one of the gyroscope outputs to a reference value equal to a gyroscope output value within the overlap between said first and second ranges and generating a control signal in accordance therewith; and switching means for switching one or the other of said first and second outputs to the gyroscope system output in accordance with said control signal so that the gyroscope which is operating within its linear range is utilized.

24. A gyroscope as defined in claim 23, wherein said first and second fiber optic gyroscopes each comprise a fiber optic interferometer coil, wherein light is introduced into said coil for propagating therearound in mutually opposite directions to emerge therefrom for detection of the relative phase shift induced by rotation of said platform, wherein the coil for said first gyroscope is described by a first quantity $L_1 R_1/\lambda_1$, where $L_1$ and $R_1$ are the length and radius of the first coil, respectively, and $\lambda_1$ is the wavelength of the light propagating in said first coil, said first quantity providing a linear device output for said first range of rotation rates of said platform, while the coil for said second gyroscope is described by a second quantity $L_2 R_2/\lambda_2$, where $L_2$ and $R_2$ are the length and radius of said second coil, and $\lambda_2$ is wavelength of the light propagating in said second coil, said second quantity providing a linear device output for said second range of rotation rates of said platform.

25. A gyroscope system as defined in claim 23, further comprising means for measuring the angular position of said platform in the said plane, said angular position measuring means connected to the output of said switching circuit.

26. A gyroscope system as defined in claim 25, wherein said switching circuit further comprises:

first voltage controlled oscillator means for converting the output signal from said first optical fiber gyroscope to a first pulse frequency signal proportional thereto;

a second voltage controlled oscillator means for converting the output signal from said second optical fiber gyroscope to a second pulse frequency signal proportional thereto; and a first switch for switching one or the other of the pulse frequency signals to said angular position measuring means in accordance with the control signal from said comparing means.

27. A gyroscope system as defined in claim 26, wherein said angular position measuring means comprises a first pulse counter.

28. A gyroscope system as defined in claim 27, wherein said first pulse counter includes a polarity input for determining whether said first pulse counter adds or subtracts the pulses applied from said first switch; and wherein said gyroscope system further comprises means for determining the polarity of the detector and demodulator output signal for the pulse frequency signal switched through said first switch to said first pulse counter, and applying a second control signal representative thereof to the polarity input of said first pulse counter.

29. A gyroscope as defined in claim 28, wherein said first and second fiber optic gyroscopes each comprise a fiber optic interferometer coil, wherein light is introduced into said coil for propagating therearound in mutually opposite directions to emerge therefrom for detection of the relative phase shift induced by rotation of said platform, wherein the coil for said first gyroscope is described by a first quantity $L_1 R_1/\lambda_1$, where $L_1$ and $R_1$ are the length and radius of the first coil, respectively, and $\lambda_1$ is the wavelength of the light propagating in said first coil, said first quantity providing a linear device output for said first range of rotation rates of said platform, while the coil for said second gyroscope is described by a second quantity $L_2 R_2/\lambda_2$, where $L_2$ and $R_2$ are the length and radius of said second coil, and $\lambda_2$ is wavelength of the light propagating in said second coil, said second quantity providing a linear device output for said second range of rotation rates of said platform, said first and second gyroscope coils being coaxial and wound on a single support.

30. A gyroscope system as defined in claim 29, wherein said first and second gyroscopes further include
 a circuit for adding a non-reciprocal phase shift to the light propagating in one direction in each of said first and second gyroscope coils, said phase shift varying in accordance with an A.C. drive frequency; and
 a demodulating circuit for demodulating the output signals from said first and second gyroscopes in accordance with said A.C. drive frequency.

31. A gyroscope system as defined in claim 30, further comprising a level shift circuit disposed before one of said first and second voltage controlled oscillator means in order to ensure that each of said first and second gyroscopes produces the same frequency output from their respective voltage controlled oscillator means at said reference value.

* * * * *